(12) United States Patent
Suemitsu et al.

(10) Patent No.: US 9,297,927 B2
(45) Date of Patent: Mar. 29, 2016

(54) PHOTOSENSITIVE COMPOSITION, COLORANT DISPERSION SOLUTION, LIGHT FILTER AND LIGHT SENSOR

(71) Applicant: JSR Corporation, Minato-ku (JP)

(72) Inventors: Yuuki Suemitsu, Minato-ku (JP); Mibuko Shimada, Minato-ku (JP); Yuusuke Murata, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 14/082,840

(22) Filed: Nov. 18, 2013

(65) Prior Publication Data

US 2014/0145126 A1    May 29, 2014

(30) Foreign Application Priority Data

Nov. 27, 2012 (JP) ................. 2012-259007

(51) Int. Cl.
| | |
|---|---|
| *G02B 5/23* | (2006.01) |
| *G02B 1/04* | (2006.01) |
| *C08F 222/10* | (2006.01) |
| *G02F 1/1335* | (2006.01) |
| *G03F 1/00* | (2012.01) |
| *G03C 1/00* | (2006.01) |
| *G02B 5/22* | (2006.01) |

(52) U.S. Cl.
CPC ............ *G02B 1/04* (2013.01); *C08F 222/1006* (2013.01); *G02B 5/223* (2013.01)

(58) Field of Classification Search
USPC .......... 106/31.6, 31.65, 31.75, 413, 493, 494; 252/586; 349/106, 107; 359/891; 430/270.1, 283.1, 285.1, 7, 281.1; 546/37; 548/403; 427/162, 514; 522/111
See application file for complete search history.

(56) References Cited

U.S. PATENT DOCUMENTS

2013/0048357 A1* 2/2013 Ueta et al. ..................... 174/258

FOREIGN PATENT DOCUMENTS

| JP | 03-043484 A | | 2/1991 | |
|---|---|---|---|---|
| JP | 2006-235153 | * | 9/2006 | ............. G03F 7/004 |

* cited by examiner

*Primary Examiner* — Bijan Ahvazi
(74) *Attorney, Agent, or Firm* — Oblon, McClelland, Maier & Neustadt, L.L.P.

(57) ABSTRACT

A photosensitive composition, suitable for a hardened film capable of sufficiently blocking light in the visible range and sufficiently transmitting light in the near infrared region, is provided. The photosensitive composition contains a colorant, a compound having an ethylenic unsaturated group, a photopolymerization initiator and a solvent. The colorant contains (A1) to (A3);

(A1) a colorant of the following formula (1):

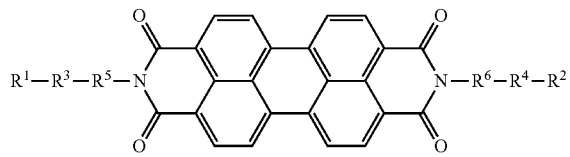

(1)

(A2) a blue colorant, a green colorant, or both, and
(A3) a yellow colorant, a red colorant, or both. $R^1$ and $R^2$ is a hydrogen atom, a hydroxyl group, a methoxy group or an acetyl group. $R^3$ and $R^4$ is a phenylene group or a direct bond. $R^5$ and $R^6$ is a direct bond or an alkanediyl group having 1 to 10 carbon atoms, with the proviso that $R^3$ and $R^5$ are not simultaneously direct bonds, and $R^4$ and $R^6$ are not simultaneously direct bonds.

14 Claims, No Drawings

PHOTOSENSITIVE COMPOSITION, COLORANT DISPERSION SOLUTION, LIGHT FILTER AND LIGHT SENSOR

FIELD OF THE INVENTION

The present invention relates to a photosensitive composition, a colorant dispersion solution, a light filter and a light sensor.

BACKGROUND OF THE INVENTION

A light sensor using infrared ray is known to be used in remote-control devices such as, for example, remote controllers of televisions and automatic doors, three dimensional shape measuring apparatuses are known. Recently, it has been used for various applications including inter-vehicular distance detection sensors used in automatic braking technique of automobiles, and a range imagery sensor used in gesture input controllers such as "Kinect (registered trade mark)" manufactured by U.S. Microsoft Corporation in various fields.

Usually, signal sources and light-receiving elements of these light sensors are provided with a light filter, which blocks visible light and transmits infrared ray for the purpose of removing noise due to visible light and in view of design. As the light filter, for example, light filters obtained from a composition containing a blue colorant, a yellow colorant and a red colorant are known (Patent Document 1).

CITATION LIST

Patent Document

Patent Document 1: JP-A-03-043484

SUMMARY OF THE INVENTION

For miniaturization and mobility of light sensors, it is necessary to reduce the size and weight of signal sources and light receiving elements. Therefore, the light filters to be used in signal sources and light receiving elements are desired to be thinner and have higher pixel density.

According to the studies of the present inventors, it was found that high density of pixels can be obtained by forming a thin light filter from a color resist containing a blue colorant, a yellow colorant and a red colorant; however, light blocking effect in the visible-light wavelength range is insufficient. It was also found that in an attempt to improve the light blocking effect in the visible-light wavelength range by increasing the contents of a blue colorant, a yellow colorant and a red colorant, the content of colorants in a color resist must be significantly increased. In this case, it turned out that the resolution of the color resist decreases, with the result that it becomes difficult to obtain high density of pixels of light filter.

In the circumstances, an object of the present invention is to provide a photosensitive composition, from which a hardened film capable of sufficiently blocking light in the visible range and sufficiently transmitting light in the near infrared region can be formed and which has excellent resolution, as well as provide a colorant dispersion solution serving as a raw material thereof. Another object of the present invention is to provide a light filter capable of sufficiently blocking light in the visible range and sufficiently transmitting light in the near infrared region even if reduced in thickness, and provide a light sensor having the light filter.

The present invention is directed to a photosensitive composition comprising a colorant, a compound having an ethylenic unsaturated group, a photopolymerization initiator and a solvent, in which
the colorant contains the following (A1) to (A3);
(A1) a colorant represented by the following formula (1) in an amount of 40 to 80 mass % based on the total amount of the colorants,
(A2) at least one colorant selected from a blue colorant and a green colorant in an amount of 10 to 40 mass % based on the total amount of the colorants, and
(A3) at least one colorant selected from a yellow colorant and a red colorant in an amount of 10 to 40 mass % based on the total amount of the colorants,

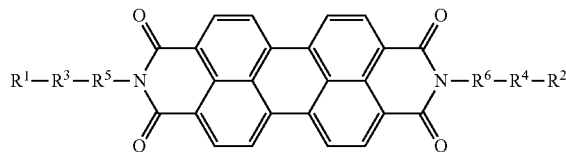

and wherein
$R^1$ and $R^2$ each independently is a hydrogen atom, a hydroxyl group, a methoxy group or an acetyl group;
$R^3$ and $R^4$ each independently is a phenylene ($-C_6H_4-$) group or a direct bond; and
$R^5$ and $R^6$ each independently is a direct bond or an alkanediyl group having 1 to 10 carbon atoms, with the proviso that $R^3$ and $R^5$ are not simultaneously direct bonds, and $R^4$ and $R^6$ are not simultaneously direct bonds.

The present invention is also directed to a colorant dispersion solution comprising a colorant and a solvent, in which
the colorant contains the following (A1) to (A3);
(A1) a colorant represented by the above formula (1) in an amount of 40 to 80 mass % based on the total amount of the colorants;
(A2) at least one colorant selected from a blue colorant and a green colorant in an amount of 10 to 40 mass % based on the total amount of the colorants, and
(A3) at least one colorant selected from a yellow colorant and a red colorant in an amount of 10 to 40 mass % based on the total amount of the colorants.

The present invention is further directed to a light filter having a hardened film comprising a colorant, in which the colorant contains the following (A1) to (A3);
(A1) a colorant represented by the above formula (1) in an amount of 40 to 80 mass % based on the total amount of the colorants;
(A2) at least one colorant selected from a blue colorant and a green colorant in an amount of 10 to 40 mass % based on the total amount of the colorants, and
(A3) at least one colorant selected from a yellow colorant and a red colorant in an amount of 10 to 40 mass % based on the total amount of the colorants.

The present invention is still further directed to a light sensor having the above light filter.

The photosensitive composition of the present invention can form a hardened film capable of sufficiently blocking light in the visible range and sufficiently transmitting light in the near infrared region, and resolution of pattern formed by the composition is excellent. The light filter of the present invention is capable of sufficiently blocking light in the visible range and sufficiently transmitting light in the near infrared region even if reduced in thickness. The colorant dispersion solution of the present invention is preferably used in the photosensitive composition of the present invention. The light sensor of the present invention can be suitably used as various light sensors including remote-control devices such as, for example, remote controller of televisions and automatic doors, in-car devices such as an inter-vehicular distance detection sensors of automobiles and range image sensors used in gesture input controllers.

DETAILED DESCRIPTION OF THE INVENTION

Hereinafter the present invention is more specifically described.
Photosensitive Composition The photosensitive composition of the present invention contains a colorant (hereinafter, also referred to as "(A) a colorant"), a compound having an ethylenic unsaturated group (hereinafter, also referred to as "(B) a compound having an ethylenic unsaturated group"), a photopolymerization initiator (hereinafter, also referred to as "(C) a photopolymerization initiator") and a solvent (hereinafter, also referred to as "(D) a solvent"), in which (A) the colorant contains the following (A1) to (A3).

(A1) a colorant represented by the following formula (1): 40 to 80 mass % of based on the total amount of the colorants, (A2) at least one colorant selected from a blue colorant and a green colorant: 10 to 40 mass % based on the total amount of the colorants, and (A3) at least one colorant selected from a yellow colorant and a red colorant: 10 to 40 mass % based on the total amount of the colorants.

Components of the photosensitive composition of the present invention are hereinafter described.
—(A) Colorant—

(A) The colorant contains a colorant (A1), a colorant (A2) and a colorant (A3). Light blocking effect in the visible range and light transmittance in the near infrared region can be provided by combining colorants (A1) to (A3).

The colorant (A1) is a perylene colorant represented by the following formula (1).

The perylene colorant has high light blocking effect in the visible range of 500 to 700 nm and high transmittance in the near infrared region of 800 nm or more.

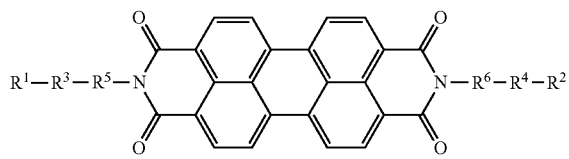

(1)

In formula (1), $R^1$ and $R^2$ each independently is a hydrogen atom, a hydroxyl group, a methoxy group or an acetyl group. Among them, a methoxy group is preferable.

Furthermore, $R^3$ and $R^4$ each independently is a phenylene (—$C_6H_4$—) group or a direct bond; and $R^3$ and $R^5$ are not simultaneously direct bonds. As $R^3$ and $R^4$, a phenylene (—$C_6H_4$—) group is preferable, wherein $R^1$ and $R^2$ each preferably take the para position on an aromatic ring as the substitution site.

$R^5$ and $R^6$ each independently is a direct bond or an alkanediyl group having 1 to 10 carbon atoms; and $R^4$ and $R^6$ are not simultaneously direct bonds. Examples of the alkanediyl group having 1 to 10 carbon atoms include a methylene group, an ethane-1,2-diyl group, an ethane-1,1-diyl group, a propane-1,1-diyl group, a propane-1,2-diyl group, a propane-1,3-diyl group, a propane-2,2-diyl group, a butane-1,2-diyl group, a butane-1,3-diyl group, a butane-1,4-diyl group, a pentane-1,4-diyl group, a pentane-1,5-diyl group, a hexane-1,5-diyl group, a hexane-1,6-diyl group, a heptane-1,7-diyl group, an octane-1,8-diyl group, a nonane-1,9-diyl group and a decane-1,10-diyl group. Among them, as $R^5$ and $R^6$, an alkanediyl group having 1 to 10 carbon atoms is preferable, an alkanediyl group having 1 to 6 carbon atoms is preferable, an alkanediyl group having 1 to 4 carbon atoms is more preferable and a methylene group and an ethane-1,2-diyl group are further preferable.

As a perylene colorant represented by the above formula (1), the colorants designated with the following color index numbers (C.I.; issued by the Society of Dyers and Colourists, the same shall apply hereinafter) may be used.

C.I. pigment black 31, C.I. pigment black 32.

A colorant represented by the above formula (1) can be obtained by reacting, for example, perylene-3,5,9,10-tetracarboxylic acid or a dianhydride thereof and an amine compound in water or an organic solvent. Operation method described in, for example, JP-A-62-1753, and JP-A-63-26784 may be used.

The colorant (A2) is at least one colorant selected from a blue colorant and a green colorant.

The blue colorant and green colorant have absorption bands in the visible range of 650 to 750 nm and transmit light in the near infrared region of 800 nm or more.

As the blue colorant and green colorant, either one of a pigment and a dye may be used. As the pigment, either one of an organic pigment and an inorganic pigment may be used. The blue colorants and green colorants may be used singly or in combination of two or more.

Examples of the blue colorant include phthalocyanine, anthraquinone, dioxazine pigments and pigments designated with the following color index numbers:

Blue pigments such as C.I. pigment blue 1, C.I. pigment blue 2, C.I. pigment blue 3, C.I. pigment blue 9, C.I. pigment blue 10, C.I. pigment blue 14, C.I. pigment blue 15, C.I. pigment blue 15:3, C.I. pigment blue 15:4, C.I. pigment blue 15:6, C.I. pigment blue 17:1, C.I. pigment blue 24, C.I. pigment blue 24:1, C.I. pigment blue 56, C.I. pigment blue 60, C.I. pigment blue 61, C.I. pigment blue 62 and C.I. pigment blue 80.

Examples of the dye include dyes designated with the following color index numbers:

Anthraquinone blue dyes such as C.I. vat blue 4, C.I. acid blue 40, C.I. reactive blue 19, C.I. reactive blue 49, C.I. disperse blue 56 and C.I. disperse blue 60;

triarylmethane blue dyes such as C.I. acid blue 7, C.I. basic blue 1, C.I. basic blue 5, C.I. basic blue 7, C.I. basic blue 11 and C.I. basic blue 26;

phthalocyanine blue dyes such as C.I. pad blue 5; and quinonimine blue dyes such as C.I. basic blue 3 and C.I. basic blue 9.

Examples of the green colorant include phthalocyanine, anthraquinone pigments and pigments designated with the following color index numbers:

Green pigments such as C.I. pigment green 1, C.I. pigment green 4, C.I. pigment green 7, C.I. pigment green 36 and C.I. pigment green 58.

Examples of the dye include dyes designated with the following color index numbers:

Azo green dyes such as C.I. direct green 28 and C.I. direct green 59; anthraquinone green dyes such as C.I. acid green 25; and triarylmethane green dyes such as C.I. basic green 1 and C.I. basic green 4.

As the colorant (A2), a blue colorant is preferable, a copper phthalocyanine pigment is preferable, and C.I. pigment blue 15:6 is further preferable, because a photosensitive composition further excellent in resolution can be obtained.

The colorant (A3) is at least one colorant selected from a yellow colorant and a red colorant.

The yellow colorant and red colorant have absorption bands in the visible range of 380 to 480 nm and transmit light in the near infrared region of 800 nm or more. Thus, they can block light in the visible range of 380 to 480 nm without damaging transmittance of light in the near infrared region.

As the yellow colorant and red colorant, either one of a pigment and a dye may be used. As the pigment, either one of an organic pigment and an inorganic pigment may be used. The yellow colorants and red colorants may be used singly or in combination of two or more.

Examples of the yellow colorant include anthraquinone, isoindolinone, condensed azo, benzimidazolone, monoazo and disazo pigments. Examples of the pigments designated with color index number include the following:

Anthraquinone yellow pigments such as C.I. solvent yellow 163, C.I. pigment yellow 24, C.I. pigment yellow 108, C.I. pigment yellow 193, C.I. pigment yellow 147, C.I. pigment yellow 199 and C.I. pigment yellow 202;

isoindolinone yellow pigments such as C.I. pigment yellow 110, C.I. pigment yellow 109, C.I. pigment yellow 139, C.I. pigment yellow 179 and C.I. pigment yellow 185;

condensed azo yellow pigments such as C.I. pigment yellow 93, C.I. pigment yellow 94, C.I. pigment yellow 95, C.I. pigment yellow 128, C.I. pigment yellow 155, C.I. pigment yellow 166 and C.I. pigment yellow 180;

benzimidazolone yellow pigments such as C.I. pigment yellow 120, C.I. pigment yellow 151, C.I. pigment yellow 154, C.I. pigment yellow 156, C.I. pigment yellow 175 and C.I. pigment yellow 181;

monoazo yellow pigments such as C.I. pigment yellow 1, C.I. pigment yellow 2, C.I. pigment yellow 3, C.I. pigment yellow 4, C.I. pigment yellow 5, C.I. pigment yellow 6, C.I. pigment yellow 9, C.I. pigment yellow 10, C.I. pigment yellow 12, C.I. pigment yellow 61, C.I. pigment yellow 62, C.I. pigment yellow 62:1, C.I. pigment yellow 65, C.I. pigment yellow 73, C.I. pigment yellow 74, C.I. pigment yellow 75, C.I. pigment yellow 97, C.I. pigment yellow 100, C.I. pigment yellow 104, C.I. pigment yellow 105, C.I. pigment yellow 111, C.I. pigment yellow 116, C.I. pigment yellow 167, C.I. pigment yellow 168, C.I. pigment yellow 169, C.I. pigment yellow 182 and C.I. pigment yellow 183; and disazo yellow pigments such as C.I. pigment yellow 12, C.I. pigment yellow 13, C.I. pigment yellow 14, C.I. pigment yellow 16, C.I. pigment yellow 17, C.I. pigment yellow 55, C.I. pigment yellow 63, C.I. pigment yellow 81, C.I. pigment yellow 83, C.I. pigment yellow 87, C.I. pigment yellow 126, C.I. pigment yellow 127, C.I. pigment yellow 152, C.I. pigment yellow 170, C.I. pigment yellow 172, C.I. pigment yellow 174, C.I. pigment yellow 176, C.I. pigment yellow 188 and C.I. pigment yellow 198.

Examples of the dye include dyes designated with the following color index numbers:

Azo yellow dyes such as C.I. acid yellow 11, C.I. direct yellow 12, C.I. reactive yellow 2 and C.I. mordant yellow 5;

quinoline yellow dyes such as C.I. solvent yellow 33, C.I. acid yellow 3 and C.I. disperse yellow 64;

nitro yellow dyes such as C.I. acid yellow 1 and C.I. disperse yellow 42;

methine yellow dyes such as C.I. disperse yellow 201; and cyanine yellow dyes such as C.I. basic yellow 1, C.I. basic yellow 11, C.I. basic yellow 13, C.I. basic yellow 21, C.I. basic yellow 28, C.I. basic yellow 51, and C.I. reactive yellow 1.

Examples of the red colorant include monoazo, disazo, monoazolake, benzimidazolone, diketopyrrolopyrrole, condensed azo, anthraquinone, quinacridon pigments and the pigments designated with the following color index numbers:

Monoazo red pigments such as C.I. pigment red 1, C.I. pigment red 2, C.I. pigment red 3, C.I. pigment red 4, C.I. pigment red 5, C.I. pigment red 6, C.I. pigment red 8, C.I. pigment red 9, C.I. pigment red 12, C.I. pigment red 14, C.I. pigment red 15, C.I. pigment red 16, C.I. pigment red 17, C.I. pigment red 21, C.I. pigment red 22, C.I. pigment red 23, C.I. pigment red 31, C.I. pigment red 32, C.I. pigment red 112, C.I. pigment red 114, C.I. pigment red 146, C.I. pigment red 147, C.I. pigment red 151, C.I. pigment red 170, C.I. pigment red 184, C.I. pigment red 187, C.I. pigment red 188, C.I. pigment red 193, C.I. pigment red 210, C.I. pigment red 245, C.I. pigment red 253, C.I. pigment red 258, C.I. pigment red 266, C.I. pigment red 267, C.I. pigment red 268 and C.I. pigment red 269;

disazo red pigments such as C.I. pigment red 37, C.I. pigment red 38 and C.I. pigment red 41;

monoazolake red pigments such as C.I. pigment red 48:1, C.I. pigment red 48:2, C.I. pigment red 48:3, C.I. pigment red 48:4, C.I. pigment red 49:1, C.I. pigment red 49:2, C.I. pigment red 50:1, C.I. pigment red 52:1, C.I. pigment red 52:2, C.I. pigment red 53:1, C.I. pigment red 53:2, C.I. pigment red 57:1, C.I. pigment red 58:4, C.I. pigment red 63:1, C.I. pigment red 63:2, C.I. pigment red 64:1 and C.I. pigment red 68;

benzimidazolone red pigments such as C.I. pigment red 171, C.I. pigment red 175, C.I. pigment red 176, C.I. pigment red 185 and C.I. pigment red 208;

diketopyrrolopyrrole red pigments such as C.I. pigment red 254, C.I. pigment red 255, C.I. pigment red 264, C.I. pigment red 270 and C.I. pigment red 272;

condensed azo red pigments such as C.I. pigment red 220, C.I. pigment red 144, C.I. pigment red 166, C.I. pigment red 214, C.I. pigment red 220, C.I. pigment red 221 and C.I. pigment red 242;

anthraquinone red pigments such as C.I. pigment red 168, C.I. pigment red 177, C.I. pigment red 216, C.I. solvent red 149, C.I. solvent red 150, C.I. solvent red 52 and C.I. solvent red 207; and quinacridon red pigments such as C.I. pigment red 122, C.I. pigment red 202, C.I. pigment red 206, C.I. pigment red 207 and C.I. pigment red 209.

Furthermore, examples of the dye include dyes designated with the following color index numbers:

Azo red dyes such as C.I. acid red 37, C.I. acid red 180, C.I. acid blue 29, C.I. direct red 28, C.I. direct red 83, C.I. reactive red 17, C.I. reactive red 120, C.I. disperse red 58, C.I. basic red 18 and C.I. mordant red 7;

anthraquinone red dyes such as C.I. disperse red 60;

xanthene red dyes such as C.I. acid red 52, C.I. acid red 87, C.I. acid red 92, C.I. acid red 289 and C.I. acid red 388; and cyanine red dyes such as C.I. basic red 12, C.I. basic red 13 and C.I. basic red 14.

As the colorant (A3), a yellow colorant is preferable, an isoindolinone pigment is preferable and C.I. pigment yellow 139 is further preferable, because the resultant photosensitive composition further excellent in resolution can be obtained.

The photosensitive composition of the present invention can employ other colorants except a colorant (A1), a colorant (A2) and a colorant (A3) for the purpose of controlling color tone as long as the effect of the present invention is not damaged. As the other colorants, either one of a pigment and a dye may be used. As the pigment, either one of an organic pigment and an inorganic pigment may be used. As the dye, either one of an organic dye and an inorganic dye may be used. The other colorants may be used singly or in combination of two or more.

Examples of the other colorants include the following pigments designated with color index numbers:

orange pigments such as C.I. pigment orange 5, C.I. pigment orange 13, C.I. pigment orange 14, C.I. pigment orange 24, C.I. pigment orange 34, C.I. pigment orange 36, C.I. pigment orange 38, C.I. pigment orange 40, C.I. pigment orange 43, C.I. pigment orange 46, C.I. pigment orange 49, C.I. pigment orange 61, C.I. pigment orange 64, C.I. pigment orange 68, C.I. pigment orange 70, C.I. pigment orange 71, C.I. pigment orange 72, C.I. pigment orange 73 and C.I. pigment orange 74;

violet pigments such as C.I. pigment violet 1, C.I. pigment violet 2, C.I. pigment violet 3, C.I. pigment violet 3:1, C.I. pigment violet 3:3, C.I. pigment violet 19, C.I. pigment violet 23, C.I. pigment violet 27, C.I. pigment violet 29, C.I. pigment violet 32, C.I. pigment violet 36, C.I. pigment violet 38 and C.I. pigment violet 39;

brown pigments such as C.I. pigment brown 23 and C.I. pigment brown 25;

black pigments such as C.I. pigment black 1 and C.I. pigment black 7; and inorganic pigments such as titanium oxide, barium sulfate, calcium carbonate, zinc oxide, lead sulfate, titanium black, synthesized iron black and carbon black.

Examples of the organic dye include dyes designated with the following color index (C.I.) number:

Azo dyes such as C.I. acid orange 7, C.I. direct orange 26, C.I. reactive black 5, C.I. disperse orange 5 and C.I. mordant black 7;

triarylmethane dyes such as C.I. basic violet 1, C.I. basic violet 3 and C.I. basic violet 14;

xanthene dyes such as C.I. basic violet 11;

nitro dyes such as C.I. acid orange 3; and cyanine dyes such as C.I. basic violet 7 and C.I. basic violet 16.

In the present invention, in the case of using a pigment as (A) the colorant, the pigment may be purified by recrystallization, reprecipitation, solvent cleaning, sublimation, vacuum heating or a combination of these and put in use. The pigment may be used, if desired, by modifying the surface of particles thereof with a resin. As the resin to be used for modifying the surface of pigment particles, a vehicle resin described in JP-A-2001-108817 or various commercially available resins for dispersing pigments are mentioned. As a method for coating a carbon-black surface with a resin, methods described in e.g., JP-A-H9-71733, JP-A-H9-95625 and JP-A-H9-124969 may be employed. Furthermore, in the case of an organic pigment, a primary particle thereof may be pulverized by so-called salt milling and then put in use. As the salt milling method, for example, a method disclosed in JP-A-H08-179111 may be employed. The dispersion particle diameter of an organic pigment, which is measured by a dynamic light scattering method, is usually set at 1 nm to 200 nm in consideration of balance between dispersion stability and resolution.

In the present invention, (A) the colorant, if desired, may be used together with a dispersant. The dispersant is used for homogeneously dissolving or dispersing a colorant in a photosensitive composition and a colorant dispersion solution. As the dispersant, an appropriate dispersant such as cationic, anionic and nonionic dispersants may be used. Among these dispersants, in view of improving a light blocking effect and resolution, a polymer dispersant is preferable. Examples of the polymer dispersant include an acrylic copolymer, polyurethane, polyester, polyethyleneimine and polyallylamine. The dispersants may be used singly or in combination of two or more.

Such a dispersant is commercially available. Examples of the acrylic copolymer include Disperbyk-2000, Disperbyk-2001 and BYK-LPN6919, BYK-LPN21116, and BYK-LPN21324 (all are manufactured by BYK Chemie GmbH). Examples of the polyurethane include Disperbyk-161, Disperbyk-162, Disperbyk-165, Disperbyk-167, Disperbyk-170, Disperbyk-182 (all manufactured by BYK Chemie GmbH); and Solsperse 76500 and Solsperse 37500 (all are manufactured by Lubrizol Corp.). Examples of the polyethyleneimine include Solsperse 24000 (manufactured by Lubrizol Corp.). Examples of the polyester include Ajisper PB821, Ajisper PB822 and Ajisper PB880 (all are manufactured by Ajinomoto Fine-Techno Co., Inc.). As the acrylic copolymer, the copolymers disclosed in JP-A-2011-232735, JP-A-2011-237769 and JP-A-2012-32767 may be used. The content of a dispersant may be appropriately set as long as the content does not inhibit the objects of the present invention.

In the present invention, a dispersion aid may be used together with a dispersant.

It is necessary for the light filter used in a light sensor using infrared ray to block light within the wavelength rage of 425 nm to 750 nm.

A colorant represented by the above formula (1) is superior in light blocking effect in the wavelength range of 500 nm to 700 nm; however, inferior in light blocking effect in a visible-light wavelength range of near 380 nm to 480 nm and a wavelength range of near 650 nm to 750 nm. Therefore, in a color filter containing the perylene colorant alone, the light blocking effect in a visible-light wavelength range is not sufficient. Then, in the present invention, in addition to a colorant represented by the above formula (1), a colorant (A3) excellent in light blocking effect in a wavelength range of near 380 to 480 nm and a colorant (A2) excellent in light blocking effect in a wavelength range of near 650 to 750 nm are contained. Because of this, sufficient light blocking effect within the visible range is ensured.

Not only by containing a colorant (A1), a colorant (A2) and a colorant (A3) essentially as (A) a colorant but also by controlling the content of these as follows, the transmittance of light in the visible range through a light filter obtained from the photosensitive composition can be sufficiently reduced even if the total content of the colorants in the solid content of the photosensitive composition is reduced. Since the content of a colorant which does not contribute to improvement of a resolution can be reduced, a photosensitive composition excellent in resolution is obtained.

The content of the colorant (A1) is 40 to 80 mass % based on the total amount of the colorants. In view of further improving light blocking effect and resolution, the content is preferably 45 to 75 mass %, more preferably 50 to 70 mass % and further preferably 55 to 65 mass %.

The content of the colorant (A2) is 10 to 40 mass % based on the total amount of the colorants. In view of further improving light blocking effect and resolution, the content is preferably 12 to 30 mass % and more preferably, 14 to 25 mass %.

The content of the colorant (A3) is 10 to 40 mass % based on the total amount of the colorants. In view of further improving light blocking effect and resolution, the content is preferably 15 to 35 mass % and more preferably, 17 to 30 mass %.

The total content of a colorant (A1), a colorant (A2) and a colorant (A3) based on the total amount of the colorants is preferably 80 to 100 mass %, more preferably 90 to 100 mass %, further preferably 95 to 100 mass % and particularly preferably 100 mass %, in view of further improving light blocking effect and resolution.

The content of (A) the colorant in the solid content of a photosensitive composition, in view of improving light blocking effect and resolution, is preferably 40 to 80 mass %, more preferably 45 to 70 mass % and further preferably 50 to 60 mass %. In the specification, the "solid content" refers to components except (D) the solvent (described later). In the present invention, by using colorant (A1), colorant (A2) and colorant (A3) in combination and controlling the content of these so as to fall within a predetermined range, light in the visible range can be sufficiently blocked and light in the near infrared region can be sufficiently transmitted to obtain a photosensitive composition excellent in resolution, even if the content of (A) the colorant in the solid content of a photosensitive composition is as low as 60 mass % or less.

—(B) Compound Having an Ethylenic Unsaturated Group—

(B) a compound having an ethylenic unsaturated group is an unsaturated compound initiating polymerization by application of radiation in the presence of (C) a photopolymerization initiator (described later) and is polymerized to form a hardened film from a photosensitive composition. An ethylenic unsaturated group may be monofunctional or polyfunctional. The term "monofunctional" herein refers to having a single ethylenic unsaturated group; whereas, the term "polyfunctional" refers to having, two or more ethylenic unsaturated groups. Among them, as (B) a compound having an ethylenic unsaturated group, in view of satisfactory polymerizability and improvement of strength of the resultant hardened film, a (meth)acrylic acid ester having two or more ethylenic unsaturated groups and a polymer having two or more ethylenic unsaturated groups are preferable. In the specification, the term "(meth)acrylic acid" refers to a concept including a methacrylic acid and acrylic acid.

Examples of the polyfunctional (meth)acrylate include a polyfunctional (meth)acrylate obtained by reacting an aliphatic polyhydroxy compound and a (meth)acrylic acid; a polyfunctional (meth)acrylate modified with a caprolactone; a polyfunctional (meth)acrylate modified with an alkylene oxide; a polyfunctional urethane(meth)acrylate obtained by reacting a (meth)acrylate having a hydroxy group and a polyfunctional isocyanate; and a polyfunctional (meth)acrylate having a carboxyl group obtained by reacting a polyfunctional (meth)acrylate having a hydroxy group and an acid anhydride.

Examples of the polyfunctional (meth)acrylate obtained by reacting an aliphatic polyhydroxy compound and a (meth)acrylic acid include trimethylolpropane tri(meth)acrylate, pentaerythritol tri(meth)acrylate, dipentaerythritol penta(meth)acrylate, dipentaerythritol hexa(meth)acrylate, tripentaerythritol hepta(meth)acrylate and tripentaerythritol octa(meth)acrylate. Examples of the polyfunctional (meth)acrylate modified with a caprolactone include compounds described in paragraphs [0015] to [0018] of the specification of JP-A-H11-44955. Examples of the polyfunctional (meth)acrylate modified with an alkylene oxide include compounds described in Claim 1 of the specification of JP-A-H10-62986 and compounds described in Claim 1 of the specification of JP-A-2008-83508. Examples of the polyfunctional urethane (meth)acrylate obtained by reacting a (meth)acrylate having a hydroxy group and a polyfunctional isocyanate include compounds described in paragraphs [0014] and [0015] of the specification of JP-A-2003-315998. Examples of the polyfunctional (meth)acrylate having a carboxyl group obtained by reacting a polyfunctional (meth)acrylate having a hydroxy group and an acid anhydride include compounds obtained by reacting pentaerythritol triacrylate and a succinic anhydride and compounds obtained by reacting dipentaerythritol pentaacrylate and a succinic anhydride.

As the polymer having two or more ethylenic unsaturated groups, a polymer having ethylenic unsaturated groups such as a (meth)acryloyl group and a carboxyl group is preferable. Examples of the polymer having ethylenic unsaturated groups and a carboxyl group include (meth)acrylic copolymers prepared by introducing ethylenic unsaturated groups via a glycidyl group and described in e.g., JP-A-H5-19467; vinyl copolymers prepared by introducing vinyl groups via an isocyanate group and described in e.g., JP-A-H6-230212; (meth)acrylic copolymers having an alicyclic (meth)acryloyl group and described in e.g., International Publication WO No. 96/23237; epoxy resins prepared by introducing (meth) acryloyl groups and a carboxy group and described in e.g., JP-A-H7-207211, JP-A-H9-325494, JP-A-H11-140144 and JP-A-2008-181095; and photosensitive resins having a fluorene skeleton and described in e.g., International Publication WO No. 09/119622. As the polymer having two or more ethylenic unsaturated groups except the polymers having ethylenic unsaturated groups and a carboxyl group, polysiloxanes having a (meth)acryloyl group in the side chain and described in JP-A-2008-242078, paragraphs [0111] and [0112] may be used.

(B) Compounds having an ethylenic unsaturated group may be used singly or in combination of two or more.

The content of (B) a compound having an ethylenic unsaturated group is usually 5 to 40 mass % of the solid content of a photosensitive composition.

—(C) Photopolymerization Initiator—

(C) The photopolymerization initiator is a compound, which generates active species capable of initiating polymerization of (B) a compound having an ethylenic unsaturated group by application of light such as visible light, ultraviolet light and far-ultraviolet light.

Examples of (C) the photopolymerization initiator include thioxanthone compounds, acetophenone compounds, biimidazole compounds, triazine compounds, O-acyloxime compounds, onium salt compounds, benzoin compounds, benzophenone compounds, α-diketone compounds, multinucleated quinone compounds, diazo compounds and imidesulfonate compounds. (C) The photopolymerization initiators may be used singly or as a mixture of two or more.

Examples of the thioxanthone compounds include thioxanthone, 2-chlorothioxanthone, 2-methylthioxanthone, 2-isopropylthioxanthone, 4-isopropylthioxanthone, 2,4-dichlorothioxanthone, 2,4-dimethylthioxanthone, 2,4-diethylthioxanthone and 2,4-diisopropylthioxanthone.

Examples of the acetophenone compounds include 2-methyl-1-[4-(methylthio)phenyl]-2-morphorinopropanone-1,2-benzyl-2-dimethylamino-1-(4-morphorinophenyl)butanone-1, and 2-(4-methylbenzyl)-2-(dimethylamino)-1-(4-morphorinophenyl)butanone-1.

Examples of the biimidazole compounds include 2,2'-bis (2-chlorophenyl)-4,4',5,5'-tetraphenyl-1,2'-biimidazole, 2,2'-bis(2,4-dichlorophenyl)-4,4',5,5'-tetraphenyl-1,2'-biimidazole and 2,2'-bis(2,4,6-trichlorophenyl)-4,4',5,5'-tetraphenyl-1,2'-biimidazole.

Examples of the triazine compounds include triazine compounds having a halomethyl group, such as 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(fran-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine and 2-(4-n-butoxyphenyl)-4,6-bis(trichloromethyl)-s-triazine.

Examples of the O-acyloxime compounds include 1,2-octanedione, 1-[4-(phenylthio)phenyl]-, 2-(O-benzoyloxime) ethanone, 1-[9-ethyl-6-(2-methylbenzoyl)-9H-carbazol-3-yl]-, 1-(O-acetyloxime)ethanone, 1-[9-ethyl-6-(2-methyl-4-tetrahydrofuranylmethoxybenzoyl)-9H-carbazol-3-yl]-, 1-(O-acetyloxime), and ethanone, 1-[9-ethyl-6-{2-methyl-4-(2,2-dimethyl-1,3-dioxolanyl)methoxybenzoyl}-9H-carbazol-3-yl]-, 1-(O-acetyloxime).

Among (C) the photopolymerization initiators, an acetophenone compound and an O-acyloxime compound are preferable.

In the present invention, the content of (C) the photopolymerization initiator relative to (B) the compound having an ethylenic unsaturated group (100 parts by mass) is usually 1 to 50 parts by mass and preferably 3 to 30 parts by mass. If (C) the photopolymerization initiator is contained in such a ratio, the hardened film having a sufficient hardness can be formed on a substrate.

—(D) Solvent—

(D) A solvent is a component used for uniformly dispersing or dissolving a photosensitive composition and components contained in a colorant dispersion solution other than (D) the solvent and may be appropriately selected and used as long as it does not react with the components other than (D) the solvent and has appropriate volatility. (D) The solvents may be used singly or in combination of two or more.

Examples of such a solvent include (poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol mono ethyl ether, propylene glycol mono-n-propyl ether, propylene glycol mono-n-butyl ether, dipropylene glycol monomethyl ether, dipropylene glycol mono ethyl ether, dipropylene glycol mono-n-propyl ether, dipropylene glycol mono-n-butyl ether, tripropylene glycol monomethyl ether and tripropylene glycol mono ethyl ether;

(poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, propylene glycol monoethyl ether acetate, 3-methoxybutyl acetate and 3-methyl-3-methoxybutyl acetate; ethers such as diethylene glycol dimethyl ether, diethylene glycol methyl ethyl ether, diethylene glycol diethyl ether and tetrahydrofuran;

ketones such as methyl ethyl ketone, cyclohexanone, 2-heptanone and 3-heptanone;

diacetates such as propylene glycol diacetate, 1,3-butylene glycol diacetate and 1,6-hexane diol diacetate;

alkyl lactates such as methyl lactate and ethyl lactate; esters such as ethyl 2-hydroxy-2-methyl propionate, methyl 3-methoxypropionate, ethyl 3-methoxy propionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutyl propionate, ethyl acetate, n-propyl acetate, i-propyl acetate, n-butyl acetate, i-butyl acetate, n-amyl formate, i-amyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate and ethyl 2-oxobutanoate;

aromatic hydrocarbons such as toluene and xylene; and amides or lactams such as N,N-dimethylformamide, N,N-dimethylacetamide and N-methylpyrrolidone.

Among (D) the solvents, in view of e.g., solubility, pigment dispersibility and coating property, (poly)alkylene glycol monoalkyl ether acetates are preferable and ethylene glycol monomethyl ether acetate, propylene glycol monomethyl ether acetate and propylene glycol monoethyl ether acetate are further preferable.

When solvents are used in combination of two or more, a solvent having a high boiling point such as benzyl ethyl ether, di-n-hexyl ether, acetonyl acetone, isophorone, caproic acid, caprylic acid, 1-octanol, 1-nonanol, benzyl acetate, ethyl benzoate, diethyl oxalate, diethyl maleate, γ-butyrolactone, ethylene carbonate, propylene carbonate and ethylene glycol monophenyl ether acetate may be used in combination.

The content of (D) a solvent is not particularly limited; however, usually, the solvent is used such that the total concentration of components obtained by removing (D) the solvent from the photosensitive composition falls within the range of 5 to 70 mass %.

—(E) Alkali Soluble Polymer—

In the present invention, in developing a coating film of a photosensitive composition with an alkaline liquid (alkali developer), in order to improve the developability of the coating film, (E) an alkali soluble polymer may be further contained.

(E) The alkali soluble polymer is not particularly limited as long as the polymer has one or more acidic group in a molecule. Examples of the acidic group include a carboxyl group, a phenolic hydroxy group and a sulfo group. As such a polymer, a (meth)acrylic monomer having one or more acidic groups (hereinafter, also referred to as "unsaturated monomer (e1)") and a copolymer between the monomer and a radical polymerizable ethylenic unsaturated monomer (hereinafter, also referred to as "unsaturated monomer (e2)") are preferable.

Examples of the unsaturated monomer (e1) include (meth)acrylic acid, maleic acid, maleic anhydride, mono[2-(meth)acryloyloxyethyl]succinate, ω-carboxypolycaprolactone mono(meth)acrylate and p-isopropenylphenol. These unsaturated monomers (e1) may be used singly or as a mixture of two or more.

Examples of the unsaturated monomer (e2) include N-substituted maleimides such as N-phenylmaleimide and N-cyclohexylmaleimide; aromatic vinyl compounds such as styrene, α-methylstyrene and p-hydroxy-α-methylstyrene; unsaturated carboxylic acid esters such as methyl(meth)acrylate, n-butyl(meth)acrylate, 2-ethylhexyl(meth)acrylate, 2-hydroxy ethyl(meth)acrylate, allyl(meth)acrylate, benzyl (meth)acrylate, polyethylene glycol (n=2 to 10) methylether (meth)acrylate, polypropylene glycol (n=2 to 10) methylether(meth)acrylate, polyethylene glycol (n=2 to 10) mono (meth)acrylate, polypropylene glycol (n=2 to 10) mono (meth)acrylate, cyclohexyl (meth)acrylate, isobornyl(meth)

acrylate, tricyclo[5.2.1.02,6]decan-8-yl(meth)acrylate, dicyclopentenyl(meth)acrylate, glycerol mono(meth)acrylate and ethylene oxide modified (meth)acrylate of paracumyl phenol; and macro monomers having a mono (meth)acryloyl group at a terminal of the polymer chain such as polystyrene, polymethyl(meth)acrylate, poly-n-butyl(meth)acrylate and polysiloxane. These unsaturated monomers (e2) may be used singly or as a mixture of two or more.

The ratio of the unsaturated monomer (e1) in the copolymer of an unsaturated monomer (e1) and an unsaturated monomer (e2) is preferably 5 to 50 mass % and further preferably 10 to 40 mass %. By copolymerizing an unsaturated monomer (e1) within such a range, a photosensitive composition having excellent storage stability and alkali developability can be obtained.

Examples of the copolymer between an unsaturated monomer (e1) and an unsaturated monomer (e2) include copolymers disclosed in e.g., JP-A-H7-140654, JP-A-H8-259876, JP-A-H10-31308, JP-A-H10-300922, JP-A-H11-174224, JP-A-H11-258415, JP-A-2000-56118 and JP-A-2004-101728.

As (E) the alkali soluble polymer, carboxyl group-containing polymers having a polymerizable unsaturated bond at a side chain such as a (meth)acryloyl group, as disclosed in JP-A-H5-19467, JP-A-H6-230212, JP-A-H7-207211, JP-A-H11-140144 and JP-A-2008-181095 may be used.

(E) The alkali soluble polymer, if it has an ethylenic unsaturated group, may be used as (B) a compound having an ethylenic unsaturated group and may be used as a dispersant if it has dispersibility.

The weight average molecular weight (Mw) of (E) an alkali soluble polymer is usually 1,000 to 300,000 and preferably 3,000 to 100,000. If Mw falls within such a range, the resultant coating film has e.g., an excellent residual film ratio and a satisfactory pattern shape, heat resistance and electric properties, and rarely produces dried foreign matter during coating by a slit nozzle system. In the specification, "Mw" refers to a polystyrene-equivalent weight average molecular weight measured by gel permeation chromatography (GPC, elution solvent: tetrahydrofuran).

Mw/Mn of (E) an alkali soluble polymer is usually 1.0 to 5.0 and preferably 1.0 to 3.0. In the specification, "Mn" refers to polystyrene-equivalent number average molecular weight measured by GPC (elution solvent: tetrahydrofuran).

In the present invention, (E) the alkali soluble polymers may be used singly or in combination of two or more.

The content of (E) an alkali soluble polymer relative to (A) a colorant (100 parts by mass) is usually 10 to 1,000 parts by mass, preferably 15 to 500 parts by mass and further preferably 20 to 300 parts by mass.

—Additives—

The photosensitive composition of the present invention contains (A) to (D) components mentioned above; however, if necessary, various additives may be contained.

Examples of the additives include a hydrogen donor; a sensitizer; a filler such as glass and alumina; a polymer compound such as a polyvinyl alcohol and a poly(fluoroalkyl acrylate); a surfactant such as a fluorine surfactant and a silicon surfactant; an adhesion promoter such as vinyl trimethoxysilane, vinyl triethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloyloxypropyltrimethoxysilane and 3-mercaptopropyltrimethoxysilane; an antioxidant such as 2,2-thiobis(4-methyl-6-t-butylphenol) and 2,6-di-t-butylphenol; a UV absorber such as 2-(3-t-butyl-5-methyl-2-hydroxyphenyl)-5-chlorobenzotriazole and an alkoxybenzophenone; an anticoagulant such as sodium polyacrylate; and a residue improver such as malonic acid, adipic acid, itaconic acid, citraconic acid, fumaric acid, measaconic acid, 2-aminoethanol, 3-amino-1-propanol, 5-amino-1-pentanol, 3-amino-1,2-propanediol, 2-amino-1,3-propanediol and 4-amino-1,2-butanediol.

When a biimidazole compound is used as a photopolymerization initiator, in view of improvement of sensitivity, a hydrogen donor is preferably used in combination. The "hydrogen donor" herein refers to a compound capable of donating a hydrogen atom to a radical generated from a biimidazole compound by application of light. Examples of the hydrogen donor include mercaptan based hydrogen donors such as 2-mercaptobenzothiazole and 2-mercaptobenzoxazole; and amine-based hydrogen donors such as 4,4'-bis(dimethylamino)benzophenone and 4,4'-bis(diethylamino)benzophenone.

Examples of the sensitizer include 4,4'-bis(dimethylamino)benzophenone, 4,4'-bis(diethylamino)benzophenone, 4-diethylaminoacetophenone, 4-dimethylaminopropiophenone, ethyl 4-dimethylaminobenzoate, 2-ethylhexyl 4-dimethylaminobenzoate, 2,5-bis(4-diethylaminobenzal)cyclohexanone, 7-diethylamino-3-(4-diethylaminobenzoyl)coumarin and 4-(diethylamino)chalcone.

—Production of Colorant Dispersion Solution and Photosensitive Composition—

The photosensitive composition of the present invention can be produced in such a manner that first, (A) a colorant is mixed and dispersed in (D) a solvent, if necessary, together with a dispersant, while pulverizing by e.g., beads mill or a roll mill to prepare a colorant dispersion solution; and then, to the colorant dispersion solution, e.g., (B) a compound having an ethylenic unsaturated group and (C) a photopolymerization initiator, if necessary, (E) an alkali soluble polymer, additives and further (D) an additional solvent are added and stirred.

Light Filter and a Production Method Thereof

The light filter of the present invention has a hardened film comprising a colorant and the colorant contains the following (A1) to (A3):

(A1) a colorant represented by the above formula (1) in an amount of 40 to 80 mass % based on the total amount of the colorants, (A2) at least one colorant selected from a blue colorant and a green colorant in an amount of 10 to 40 mass % based on the total amount of the colorants, and (A3) at least one colorant selected from a yellow colorant and a red colorant in an amount of 10 to 40 mass % based on the total amount of the colorants.

The light filter of the present invention can be formed of the photosensitive composition of the present invention.

The light filter of the present invention can sufficiently block light in the visible range and sufficiently transmit light in the near infrared range even if the film thickness is reduced, by virtue of the colorants (A1) to (A3) contained in a predetermined ratio.

The production method for the light filter of the present invention has at least the following steps (1) to (4) and is preferably performed in the following order.

(1) a step of forming a coating film of the photosensitive composition of the present invention on a substrate.

(2) a step of exposing at least a part of the coating film to light.

(3) a step of developing the coating film exposed.

(4) a step of subjecting the developed coating film to a heat treatment.

Hereinafter these steps are sequentially described.

—Step (1)—

Step (1) is a step of forming a coating film by applying the photosensitive composition of the present invention onto a substrate surface, and thereafter, if necessary, subjecting the substrate to a heat treatment (prebake).

Examples of the material for the substrate to be used in this step include glass, silicon, silicon nitride, polycarbonate, polyester, aromatic polyamide, polyamideimide and polyimide. These substrates, if desired, may be subjected to an appropriate pretreatment such as a chemical treatment with e.g., a silane coupling agent, a plasma treatment, ion plating, sputtering, vapor phase reaction or vacuum deposition.

When a photosensitive composition is applied to a substrate, an appropriate coating method such as a rotary coating method, a flow casting coating method, a roll coating method and a coating method using a slit die coater may be employed; however, a roll-coating method and a coating method using a slit die coater are preferable.

Furthermore, prebake conditions are usually 70 to 180° C. for about 1 to 10 min.

The film thickness of a coating film is usually 0.3 to 3.0 μm and preferably 0.8 to 1.7 μm.

—Step (2)—

The step (2) is a step of exposing at least a part of the coating film formed in the step (1) to light. When a part of the coating film is exposed to light, light exposure is usually performed through a photomask having a predetermined pattern.

In exposing light, ultraviolet light is used. The wavelength of ultraviolet light is preferably 365 nm. The exposure amount of ultraviolet light is usually 10 to 10,000 mJ/cm$^2$ and preferably 500 to 2000 mJ/cm$^2$.

—Step (3)—

The step (3) is a developing step using a liquid developer, preferably an alkali liquid developer.

As the alkali liquid developer, aqueous solutions of e.g., sodium carbonate, sodium hydroxide, potassium hydroxide, tetramethylammonium hydroxide, choline, 1,8-diazabicyclo-[5.4.0]-7-undecene and 1,5-diazabicyclo-[4.3.0]-5-nonene are preferable.

To the alkali liquid developer, an aqueous organic solvent such as methanol and ethanol and a surfactant may be added in appropriate amounts. The film developed is usually washed with water.

Examples of applicable development method include shower development, spray development, dip (immersion) development and paddle (liquid piling) development. The temperature of the liquid developer is usually ordinary temperature and development is performed for about 10 to 300 seconds.

—Step (4)—

Step (4) is a step of subjecting the coating film developed to a heat treatment (post baking). By means of this step, a light filter having a hardened material of the photosensitive composition of the present invention can be obtained.

The post-baking conditions are usually 100 to 300° C. and about 1 to 60 min.

The thickness of the hardened film thus formed is usually 0.3 to 3.0 μm, preferably 0.7 to 1.5 μm.

The light filter thus obtained may have the following properties.

(i) maximum transmittance of each of the light beams having a wavelength of 400 nm and 700 nm: preferably 10% or less and more preferably 7% or less.

(ii) maximum transmittance of the light beam having a wavelength of 800 nm in the near infrared region: preferably 60% or more and less than 100%.

(iii) maximum transmittance of each of the light beams having a wavelength of 900 nm and 1000 nm in the near infrared region: preferably 60% or more and less than 100%, and more preferably 90% or more and less than 100%.

As described above, the light filter of the present invention can sufficiently block light in the visible range; in contrast, sufficiently transmit light in the near infrared region.

Light Sensor

The light sensor of the present invention has the light filter of the present invention.

The light sensor may take appropriate structures such as remote-control devices including remote controllers for televisions and automatic doors, three dimensional shape measuring apparatuses, in-car devices including inter-vehicular distance detection sensors of automobiles, range image sensors used in e.g., gesture input controllers, image sensors for fax machines and copying machines, color sensors for use in monitoring color of liquid crystal displays or simple color detection and infrared ray detection devices.

The light sensor of the present invention has an advantage, due to the presence of the light filter of the present invention, in that malfunction caused by light can be sufficiently prevented.

EXAMPLES

Hereinafter the present invention is more specifically described by way of Examples; however, the present invention is not limited to these Examples. The term "part(s)" in the following Examples and Comparative Examples means "parts by mass" unless otherwise specified.

Synthesis of Dispersant

To a reaction container, 55.7 g of tetrahydrofuran (THF), 4.65 g of a THF solution (4.54 mass %) of lithium chloride and 0.45 g of diphenylethylene were added and the solution mixture was cooled to −60° C. Thereafter, 1.22 g of a hexane solution (15.36 mass %) of n-butyl lithium was added. To the reaction container, a solution mixture of 1.66 g of 1-ethoxyethyl methacrylate (EEMA), 9.9 g of n-butyl methacrylate (nBMA) and 4.14 g of methyl methacrylate (MMA) was added dropwise over 120 minutes and thereafter stirred at −60° C. for 15 minutes. The exhaustion of the monomer in the reaction container was confirmed by gas chromatography (GC method). Subsequently, to the reaction container, 3.96 g of 2-(dimethylamino)ethyl methacrylate (DMMA) was added dropwise and thereafter stirred at −60° C. for 30 minutes. After exhaustion of DMMA in the reaction container was confirmed by the GC method, methanol (0.41 g) was added to obtain a precursor polymer. To a propylene glycol monomethylether acetate solution (65.64 g) containing the resultant precursor polymer (25 mass % in concentration), water (16.44 g) was added. The resultant solution mixture was heated at 100° C. for 8 hours to remove water to obtain a propylene glycol monomethylether acetate solution (solid content concentration: 50 mass %) of a block polymer [hereinafter also referred to as "component (F-2)"] serving as a dispersant. The block polymer was a block copolymer consisting of block A having a repeating unit derived from DMMA and block B having a repeating unit having a structure obtained by hydrolysis of a 1-ethoxyethyl group of EEMA and a repeating unit derived from nBMA and MMA. The obtained polymer had a polystyrene equivalent weight average molecular weight of 8100 and a number average molecular weight of 6800 and an Mw/Mn ratio of 1.19.

"component (D-1)"] were mixed and dispersed by a paint shaker for 8 hours to obtain colorant dispersion solution 1.

Example 2, and Comparative Examples 1 to 7

Production of Colorant Dispersion Solutions 2 to 9

Colorant dispersion solutions 2 to 9 were produced in the same manner as in "Production of colorant dispersion solution 1" except that the type and amount of individual components were changed as shown in Table 1.

TABLE 1

| | Type of dispersion solution | Example 1 Dispersion solution 1 | Example 2 Dispersion solution 2 | Comparative Example 1 Dispersion solution 3 | Comparative Example 2 Dispersion solution 4 | Comparative Example 3 Dispersion solution 5 | Comparative Example 4 Dispersion solution 6 | Comparative Example 5 Dispersion solution 7 | Comparative Example 6 Dispersion solution 8 | Comparative Example 7 Dispersion solution 9 |
|---|---|---|---|---|---|---|---|---|---|---|
| For-mu-la-tion | A1-1 | 60 parts | 60 parts | 34 parts | 34 parts | 85 parts | 75 parts | 45 parts | 75 parts | 45 parts |
| | A2-1 | 15 parts | 20 parts | 33 parts | 33 parts | 5 parts | 5 parts | 45 parts | 20 parts | 10 parts |
| | A3-1 | 25 parts | 20 parts | 33 parts | 33 parts | 10 parts | 20 parts | 10 parts | 5 parts | 45 parts |
| | F-1 | 80 parts | | 80 parts | 80 parts | | | | | |
| | F-2 solution | | 80 parts | | | 80 parts | 80 parts | 80 parts | 80 parts | 80 parts |
| | E-1 solution | 120 parts | 120 parts | 120 parts | 40 parts | 120 parts | 120 parts | 120 parts | 120 parts | 120 parts |
| | D-1 | 700 parts | 700 parts | 700 parts | 700 parts | 700 parts | 700 parts | 700 parts | 700 parts | 700 parts |

Synthesis of an Alkali Soluble Polymer

In a reaction container, a solution of benzyl methacrylate (14 g), N-phenylmaleimide (12 g), 2-hydroxyethyl methacrylate (15 g), styrene (10 g) and methacrylate (20 g) are dissolved in propylene glycol monomethylether acetate (200 g), and further 2,2'-azoisobutyronitrile (3 g) and α-methylstyrene dimer (5 g) were added thereto. The reaction container was purged with nitrogen and then the reaction solution was heated at 80° C. for 5 hours while stirring and bubbling with nitrogen to obtain a solution (solid content concentration: 35 mass %) containing an alkali soluble polymer [hereinafter referred to as "component (E-1)"]. This polymer had a polystyrene equivalent weight average molecular weight of 9700, a number average molecular weight of 5700 and an Mw/Mn ratio of 1.70.

Example 1

Production of Colorant Dispersion Solution 1

C.I. pigment black 32 (60 parts) [hereinafter referred to as "component (A1-1)]" represented by the above formula (1), where $R^1$ and $R^2$ are methoxy groups, $R^3$ and $R^4$ are phenylene (—$C_6H_4$—) groups, and $R^5$ and $R^6$ are methylene groups], 15 parts of C.I. pigment blue 15:6 [hereinafter referred to as "component (A2-1)"], 25 parts of C.I. pigment yellow 139 [hereinafter referred to as "component (A3-1)"], 80 parts of Solsperse 76500 [trade name, hereinafter referred to as "component (F-1)"] manufactured by Lubrizol Corporation, Japan (solid content concentration: 50 mass %), 120 parts of a solution containing the component (E-1) (solid content concentration: 35 mass %) and 700 parts of propylene glycol monomethylether acetate [hereinafter referred to as Example 3

Production of Photosensitive Composition 1

Colorant dispersion solution 1 (1000 parts) mentioned above, 50 parts of dipentaerythritol hexaacrylate [component (B-1) shown in Table 2], 10 parts of 1,2-octanedione, 1-[4-(phenylthio)-, 2-(O-benzoyloxime)] [component (C-2) shown in Table 2], 179 parts of propylene glycol monomethylether acetate [component (D-1) shown in Table 2] and 17 parts of a solution containing the component (E-1) (solid content concentration: 35 mass %) were mixed to produce photosensitive composition 1.

Examples 4 to 8, and Comparative Examples 8 to 14

Production of Photosensitive Compositions 2 to 13

Photosensitive compositions 2 to 13 were produced in the same manner as in Example 3 except that the type and amount of individual components were changed to those shown in Tables 2 and 3.

The details of the individual components described in Tables 2 and 3 are as follows:

B-2: Succinic acid modified dipentaerythritol pentaacrylate

B-3: Pentaerythritol triacrylate

C-1: 2-benzyl-2-dimethylamino-1-(4-morpholinophenyl)-butanone-1

C-3: Ethanone, 1-[9-ethyl-6-(2-methylbenzoyl)-9H-carbazol-3-yl], 1-(O-acetyloxime)

TABLE 2

|  | Example 3 | Example 4 | Example 5 | Example 6 | Example 7 | Example 8 | Comparative Example 8 | Comparative Example 9 |
|---|---|---|---|---|---|---|---|---|
| Photosensitive composition No. | 1 | 2 | 3 | 4 | 5 | 6 | 7 | 8 |
| Formulation (parts) Colorant dispersion solution 1 | 1000 | 1000 | 1000 |  |  |  |  |  |
| Colorant dispersion solution 2 |  |  |  | 1000 | 1000 | 1000 |  |  |
| Colorant dispersion solution 3 |  |  |  |  |  |  | 1000 |  |
| Colorant dispersion solution 4 |  |  |  |  |  |  |  | 920 |
| B-1 | 50 | 50 | 50 | 50 |  |  | 50 | 33 |
| B-2 |  |  |  |  | 50 |  |  |  |
| B-3 |  |  |  |  |  | 50 |  |  |
| C-1 |  | 5 | 3 | 5 | 5 | 5 | 3 | 3 |
| C-2 | 10 |  | 7 |  |  |  | 7 | 7 |
| C-3 |  | 5 |  | 5 | 5 | 5 |  |  |
| D-1 | 179 | 179 | 179 | 179 | 179 | 179 | 179 | 183 |
| E-1 solution | 17 | 17 | 17 | 17 | 17 | 17 | 17 | 10 |
| Content (mass %) of colorants in the total amount of components except component (D-1) | 40 | 40 | 40 | 40 | 40 | 40 | 40 | 50 |
| Content (mass %) of colorant (A1) in the total amount of the colorants | 60 | 60 | 60 | 60 | 60 | 60 | 34 | 34 |
| Content (mass %) of colorant (A2) in the total amount of the colorants | 15 | 15 | 15 | 20 | 20 | 20 | 33 | 33 |
| Content (mass %) of colorant (A3) in the total amount of the colorants | 25 | 25 | 25 | 20 | 20 | 20 | 33 | 33 |
| Content (mass %) of colorants A1 + A2 + A3 in the total amount of the colorants | 100 | 100 | 100 | 100 | 100 | 100 | 100 | 100 |

TABLE 3

|  | Comparative Example 10 | Comparative Example 11 | Comparative Example 12 | Comparative Example 13 | Comparative Example 14 |
|---|---|---|---|---|---|
| Photosensitive composition No. | 9 | 10 | 11 | 12 | 13 |
| Formulation (parts) Colorant dispersion solution 5 | 1000 |  |  |  |  |
| Colorant dispersion solution 6 |  | 1000 |  |  |  |
| Colorant dispersion solution 7 | 1000 |  |  |  |  |
| Colorant dispersion solution 8 |  |  |  | 1000 |  |
| Colorant dispersion solution 9 |  |  |  |  | 1000 |
| B-1 | 50 | 50 | 50 | 50 | 50 |
| B-2 |  |  |  |  |  |
| B-3 |  |  |  |  |  |
| C-1 |  |  |  |  |  |
| C-2 | 10 | 10 | 10 | 10 | 10 |
| C-3 |  |  |  |  |  |
| D-1 | 179 | 179 | 179 | 179 | 179 |
| E-1 solution | 17 | 17 | 17 | 17 | 17 |
| Content (mass %) of colorants in the total amount of components except component (D-1) | 40 | 40 | 40 | 40 | 40 |
| Content (mass %) of colorant (A1) in the total amount of the colorants | 85 | 75 | 45 | 75 | 45 |
| Content (mass %) of colorant (A2) in the total amount of the colorants | 5 | 5 | 45 | 20 | 10 |
| Content (mass %) of colorant (A3) in the total amount of the colorants | 10 | 20 | 10 | 5 | 45 |
| Content (mass %) of colorants A1 + A2 + A3 in the total amount of the colorants | 100 | 100 | 100 | 100 | 100 |

Evaluation of Photosensitive Composition 1
Transmittance and Light Blocking Effect Onto a glass substrate, composition 1 was applied by a spin coating method and heated at 100° C. for 180 seconds to form a coating film. Thereafter, the entire coating film on the substrate was exposed to light (at a wavelength of 365 nm and an exposure amount of 1000 mJ/cm$^2$). Subsequently, the coating film was brought into contact with an aqueous solution containing a tetramethylammonium hydroxide (0.05 mass %) for 15 seconds and then washed. Subsequently, the glass substrate having the coating film was heated by a hot plate of 200° C. for 300 seconds to obtain a glass wafer having a light filter of 1.23 μm in thickness.

Using the glass wafer having the light filter and a spectrophotometer (V-7300 manufactured by JASCO Corporation), transmittance (% T) of each of the light beams having a wavelength of 400 nm, 500 nm, 600 nm, 700 nm, 800 nm, 900 nm and 1000 nm through the light filter was measured to evaluate transmittance and light blocking effect of the light filter obtained from photosensitive composition 1. The evaluation results are shown in Table 4. However, the transmittance of Table 4 is a value relative to a glass substrate.

The film thickness was measured by a stylus-based surface profiler (Alpha Step IQ manufactured by Yamato Scientific Co., Ltd.).

Resolution

Onto a silicon wafer, photosensitive composition 1 was applied by a spin coating method and heated at 100° C. for 180 seconds to form a coating film. The coating film was exposed to light by a reduced projection exposure (NSR- 2005i10D manufactured by Nikon Corporation, wavelength: 365 nm, exposure amount: 1000 mJ/cm²) through a mask. Subsequently, the coating film was developed by bringing the film into contact with an aqueous solution containing 0.05 mass % tetramethylammonium hydroxide for 15 seconds. Subsequently, the silicon wafer having the developed coating film was heated by a hot plate of 200° C. for 300 seconds to obtain a pattered light filter having squares of 3 μm in side.

The height and the sectional shape of a patterned square and the presence or absence of residue between patterned squares were observed by an electron microscope to evaluate the resolution of photosensitive composition 1. The height of the patterned square was measured by an electron microscope. The sectional shape of the patterned square and the presence or absence of residue between patterned squares was evaluated based on the following criteria. The evaluation results are shown in Table 4.

Evaluation Criteria
Sectional Shape of Patterned Square
  A: square.
  B: not square.
  C: not patterned.
The presence or absence of residue between patterned squares
  A: Not present.
  B: Present.
Evaluation of Photosensitive Compositions 2 to 13
  The transmittance, light blocking effect and resolution of photosensitive compositions 2 to 13 were evaluated in the same manner as in "Evaluation of photosensitive composition 1" mentioned above. The evaluation results of photosensitive compositions 2 to 8 and the evaluation results of photosensitive compositions 9 to 13 are shown in Table 4 and Table 5, respectively.

TABLE 4

|  |  | Example 3 | Example 4 | Example 5 | Example 6 | Example 7 | Example 8 | Comparative Example 8 | Comparative Example 9 |
|---|---|---|---|---|---|---|---|---|---|
| Photosensitive composition No. |  | 1 | 2 | 3 | 4 | 5 | 6 | 7 | 8 |
| Trans-mittance | Film thickness (μm) | 1.23 | 1.20 | 1.21 | 1.21 | 1.21 | 1.22 | 1.20 | 1.22 |
|  | Wavelength 400 nm (% T) | 2 | 2 | 2 | 7 | 3 | 6 | 7 | 2 |
|  | Wavelength 500 nm (% T) | 1 | 1 | 1 | 1 | 1 | 1 | 16 | 9 |
|  | Wavelength 600 nm (% T) | 3 | 2 | 3 | 1 | 2 | 1 | 9 | 3 |
|  | Wavelength 700 nm (% T) | 7 | 6 | 7 | 5 | 5 | 4 | 17 | 10 |
|  | Wavelength 800 nm (% T) | 78 | 75 | 76 | 67 | 64 | 65 | 64 | 64 |
|  | Wavelength 900 nm (% T) | 93 | 95 | 94 | 93 | 92 | 93 | 93 | 92 |
|  | Wavelength 1000 nm (% T) | 98 | 97 | 98 | 96 | 95 | 97 | 97 | 96 |
| Resolution | Height of patterned square | 1.2 | 1.2 | 1.2 | 1.2 | 1.2 | 1.2 | 1.2 | 1.2 |
|  | Sectional shape of patterned square | A | A | A | A | A | A | A | C |
|  | Presence or absence of residue between patterned squares | A | A | A | A | A | A | B | — |

TABLE 5

|  |  | Comparative Example 10 | Comparative Example 11 | Comparative Example 12 | Comparative Example 13 | Comparative Example 14 |
|---|---|---|---|---|---|---|
| Photosensitive composition No. |  | 9 | 10 | 11 | 12 | 13 |
| Transmittance | Film thickness (μm) | 1.20 | 1.20 | 1.20 | 1.20 | 1.20 |
|  | Wavelength 400 nm (% T) | 8 | 5 | 13 | 12 | 2 |
|  | Wavelength 500 nm (% T) | 2 | 2 | 8 | 3 | 2 |
|  | Wavelength 600 nm (% T) | 6 | 8 | 1 | 2 | 12 |
|  | Wavelength 700 nm (% T) | 12 | 15 | 3 | 7 | 22 |
|  | Wavelength 800 nm (% T) | 76 | 78 | 64 | 66 | 81 |
|  | Wavelength 900 nm (% T) | 96 | 94 | 97 | 96 | 97 |
|  | Wavelength 1000 nm (% T) | 98 | 97 | 96 | 98 | 97 |
| Resolution | Height of patterned square | 1.2 | 1.2 | 1.2 | 1.2 | 1.2 |
|  | Sectional shape of patterned square | A | A | A | A | A |
|  | Presence or absence of residue between patterned squares | A | A | A | A | A |

What is claimed is:

1. A photosensitive composition, comprising:
   colorants;
   a compound comprising an ethylenic unsaturated group;
   a photopolymerization initiator; and
   a solvent,
   wherein the colorants comprise:
   (A1) a colorant of formula (1) in an amount of 40 to 80 mass % based on the total amount of the colorants;
   (A2) a colorant selected from the group consisting of a blue colorant and a green colorant, in an amount of 10 to 40 mass % based on the total amount of the colorants; and
   (A3) a colorant selected from the group consisting of a yellow colorant and a red colorant, in an amount of 10 to 40 mass % based on the total amount of the colorants,

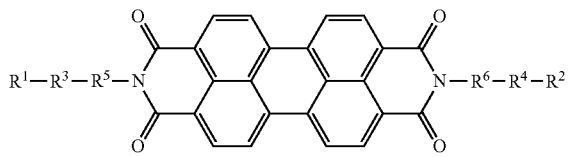

(1)

wherein the colorant (A1) is different from the colorant (A3);
   $R^1$ and $R^2$ each independently is a hydrogen atom, a hydroxyl group, a methoxy group or an acetyl group;
   $R^3$ and $R^4$ each independently is a phenylene group or a direct bond; and
   $R^5$ and $R^6$ each independently is a direct bond or an alkanediyl group having 1 to 10 carbon atoms, with the proviso that $R^3$ and $R^5$ are not simultaneously direct bonds, and $R^4$ and $R^6$ are not simultaneously direct bonds, and
   wherein the total content of the colorants is from 40 to 80 mass % based on the total amount of the solid content components except the solvent in the photosensitive composition.

2. The photosensitive composition according to claim 1, wherein the colorant (A2) is a blue colorant.

3. The photosensitive composition according to claim 2, wherein the blue colorant is a copper phthalocyanine pigment.

4. The photosensitive composition according to claim 2, wherein the blue colorant is Pigment Blue 15:6.

5. The photosensitive composition according to claim 1, wherein the colorant (A3) is a yellow colorant.

6. The photosensitive composition according to claim 5, wherein the yellow colorant is an isoindoline pigment.

7. The photosensitive composition according to claim 5, wherein the yellow colorant is Pigment Yellow 139.

8. The photosensitive composition according to claim 1, wherein the content of the colorants in the solid content of the photosensitive composition is 60 mass % or less.

9. The photosensitive composition according to claim 1, wherein the colorant (A1) is selected from the group consisting of C.I. pigment black 31 and C. I. pigment black 32.

10. The photosensitive composition according to claim 1, wherein $R^5$ and $R^6$ each independently is a methylene group and an ethane-1,2-diyl group.

11. A light filter, obtained from the photosensitive composition of claim 1; wherein the light filter comprises a substrate.

12. A light sensor, comprising:
    the light filter of claim 11.

13. A light filter, comprising a hardened material of a photosensitive composition,
    wherein the photosensitive composition comprises:
    colorants;
    a compound comprising an ethylenic unsaturated group;
    a photopolymerization initiator; and
    a solvent,
    wherein the colorants comprise:
    (A1) a colorant of formula (1) in an amount of 40 to 80 mass % based on the total amount of the colorants;
    (A2) a colorant selected from the group consisting of a blue colorant and a green colorant, in an amount of 10 to 40 mass % based on the total amount of the colorants; and
    (A3) a colorant selected from the group consisting of a yellow colorant and a red colorant, in an amount of 10 to 40 mass % based on the total amount of the colorants,

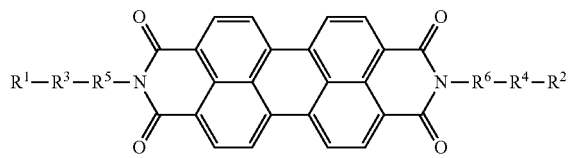

(1)

wherein the colorant (A1) is different from the colorant (A3);
    $R^1$ and $R^2$ each independently is a hydrogen atom, a hydroxyl group, a methoxy group or an acetyl group;
    $R^3$ and $R^4$ each independently is a phenylene group or a direct bond; and
    $R^5$ and $R^6$ each independently is a direct bond or an alkanediyl group having 1 to 10 carbon atoms, with the proviso that $R^3$ and $R^5$ are not simultaneously direct bonds, and $R^4$ and $R^6$ are not simultaneously direct bonds, and
    wherein the total content of the colorants is from 40 to 80 mass % based on the total amount of the solid content components except the solvent in the photosensitive composition.

14. A light sensor comprising the light filter according to claim 13.

* * * * *